United States Patent [19]
Choi et al.

[11] Patent Number: 6,046,303
[45] Date of Patent: Apr. 4, 2000

[54] SOLUBLE POLYIMIDE RESIN HAVING ALKOXY SUBSTITUENTS AND THE PREPARATION METHOD THEREOF

[75] Inventors: Kil-Yeong Choi; Mi-Hie Yi; Moon-Young Jin, all of Daejeon; Jin-Tae Jung, Seoul; Jeong-Ghi Koo; Jae-Eun Cho, both of Kyungki-do, all of Rep. of Korea

[73] Assignee: Korea Research Institute of Chemical Technology, Rep. of Korea

[21] Appl. No.: 09/151,722

[22] Filed: Sep. 11, 1998

[30] Foreign Application Priority Data

Sep. 12, 1997 [KR] Rep. of Korea ............... 97-47253

[51] Int. Cl.⁷ ............................................. C08G 73/10
[52] U.S. Cl. ..................... 528/353; 528/125; 528/128; 528/170; 528/172; 528/173; 528/174; 528/179; 528/171; 528/185; 528/188; 528/220; 528/229; 528/350
[58] Field of Search ..................... 528/170, 353, 528/350, 125, 128, 172, 173, 174, 179, 188, 185, 220, 229

[56] References Cited

U.S. PATENT DOCUMENTS 5,610,265  3/1997  Tan .................................. 528/353

*Primary Examiner*—P. Hampton-Hightower
*Attorney, Agent, or Firm*—Finnegan, Henderson, Farabow, Garrett & Dunner, L.L.P.

[57] ABSTRACT

The invention herein relates to a soluble polyimide resin for a liquid crystal alignment layer and the manufacturing method thereof, wherein a mixture of aliphatic tetracarboxylic acid dianhydrides and aromatic diamine having aliphatic side chains are used to yield a soluble polyimide resin which has superior heat-resistance, solubility, surface hardness, transparency and liquid crystal alignment capacity.

The soluble polyimide resin having alkoxy substituents, for a liquid crystal layer, according to the present invention, is manufactured by adding a mixture of dioxotetrahydrofuran 3-methylcyclohexene-1,2-dicarboxylic dianhydride, which is an aliphatic tetracarboxylic acid dianhydride and aromatic tetracarboxylic acid dianhydride to a mixture of aromatic diamine, and said dioxotetrahydrofuran 3-methylcyclohexene-1,2-dicarboxylic dianhydride is used in the amount of 50 to 99 mol % to the total amount of anhydrides.

The polyimide resin according to the present invention not only has superior heat-resistance and mechanical characteristics but also excellent solubility and transparency, which could be applicable as a liquid crystal alignment layer for the TFT-LCD requiring difficult processing condition such as a low temperature and vigorous rubbing processing. Further, the polyimide resin may be useful as basic heat resistant structural materials for advanced industry.

8 Claims, 1 Drawing Sheet

SOLUBLE POLYIMIDE RESIN HAVING ALKOXY SUBSTITUENTS AND THE PREPARATION METHOD THEREOF

FIELD OF THE INVENTION

The invention herein relates to a soluble polyimide resin for a liquid crystal alignment layer and the manufacturing method thereof, wherein aliphatic tetracarboxylic acid dianhydride and aromatic diamine having an aliphatic side chain are used to yield a soluble polyimide resin which has superior heat-resistance, solubility, surface strength, transparency and liquid crystal alignment capacity.

BACKGROUND OF THE INVENTION

In general, a polyimide resin refers to a high heat-resistant resin, which is manufactured by condensation polymerization of aromatic tetracarboxylic acid or the derivatives thereof with aromatic diamine, or aromatic diisocyanate followed by imidization.

Further, the polyimide resin can have a variety of molecular structures depending on the types of the monomers used therein. As for the aromatic tetracarboxylic acid constituent, pyromellitic dianhydride (PMDA) or biphenyltetracarboxylic acid dianhydride (BPDA) is used. As for the aromatic diamine constituent, oxydianiline (ODA) or p-phenylene diamine (p-PDA) is used for condensation polymerization. The typical polyimide resin has a repetitive unit of the following formula 1:

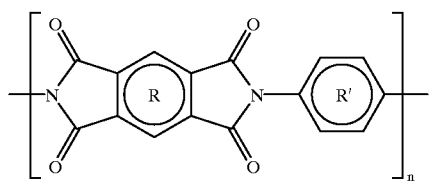

(1)

The polyimide resin with formula 1 as a repetitive unit is high heat-resistant, insoluble, and non-meltable with the following properties:

(1) excellent thermo-oxidative property;

(2) superior heat-resistance based on the utilization at high temperature, i.e., 260° C. for a long-term use, and 480° C. for a short-term use;

(3) excellent electrochemical and mechanical properties;

(4) excellent radiation resistance and low temperature properties;

(5) intrinsic non-combustible properties; and, (6) excellent chemicals-resistant properties.

In spite of the fact that the polyimide resin with formula 1 as repetitive unit possesses an excellent heat resistance property, the processing therein is extremely difficult due to insolubility and non-melting property thereof.

To overcome the shortcomings of the polyimide resin, several methods have been devised: a) method of introducing polar groups into the backbone or side chains of the polymer, b) method of introducing the connecting groups or bulky pendant groups into the polymer, and c) method of enhancing the flexibility of the backbone of the polymer.

In particular, as part of research to enhance the solubility of the polyimide, T. Kurosaki et al. discloses a method of preparing a soluble PI coating solution using alicyclic anhydride as a monomer (Macromolecules, 1994, 27, 1117 and 1993, 26, 4961). Also, Qn Jin et al. discloses a method of preparing a soluble polyimide resin using cyclic diamine (J. P. S. Part A. Polym. Chem. Ed., 31, 2345–2351).

In the present invention, a mixture of dioxotetrahydrofuran 3-methylcyclohexene-1,2-dicarboxylic dianhydride (DOCDA), which is an alicyclic dianhydride, and aromatic tetracarboxylic acid dianhydride, in addition to an aromatic diamine compound having an alkoxy side chain were used to prepare a novel soluble polyimide having excellent heat-resistance, transparency and liquid crystal alignment capacity.

As such, the objectives of the invention herein lie in providing a soluble polyimide resin having an alkoxy substituent for a liquid crystal alignment and the monomer thereof, which has superior heat-resistance, transparency and liquid crystal alignment capacity. Further, the objective of the invention includes the manufacturing method of the same.

DETAILED DESCRIPTION OF PREFERRED EMBODIMENTS

Figure 1:
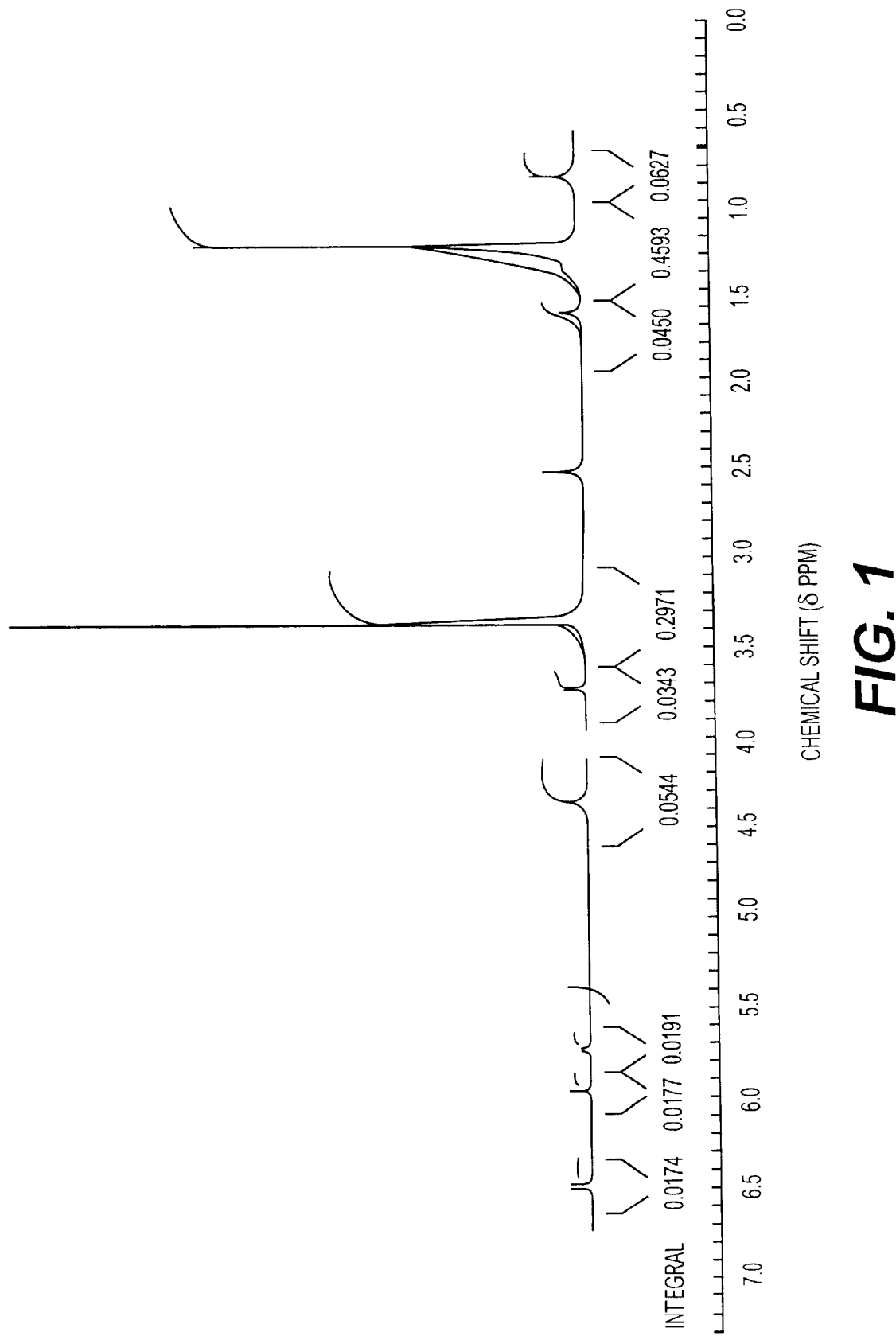

In order to achieve the objective of the present invention, a soluble polyimide resin having an alkoxy substituent, as represented by Formula 1, for a liquid crystal layer is manufactured by adding a mixture of dioxotetrahydrofuran 3-methylcyclohexene-1,2-dicarboxylic dianhydride, which is a tetracarboxylic acid dianhydride as represented by Formula 2, and aromatic tetracarboxylic acid dianhydride to aromatic diamine, and said dioxotetrahydrofuran 3-methylcyclohexene-1,2-dicarboxylic dianhydride (Formula 2) is used in the amount of 50 to 99 mol % to the total amount of anhydrides therein:

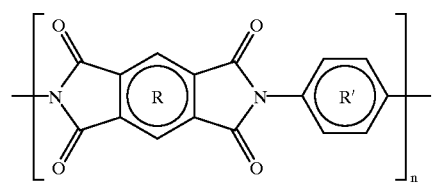

(1)

wherein

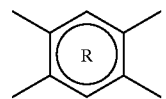

is two or more tetravalent groups selected from the following:

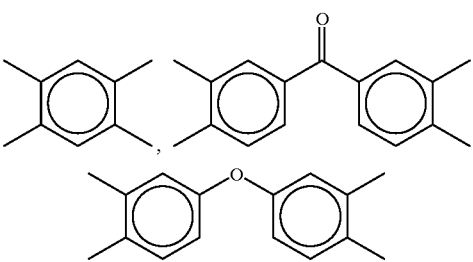

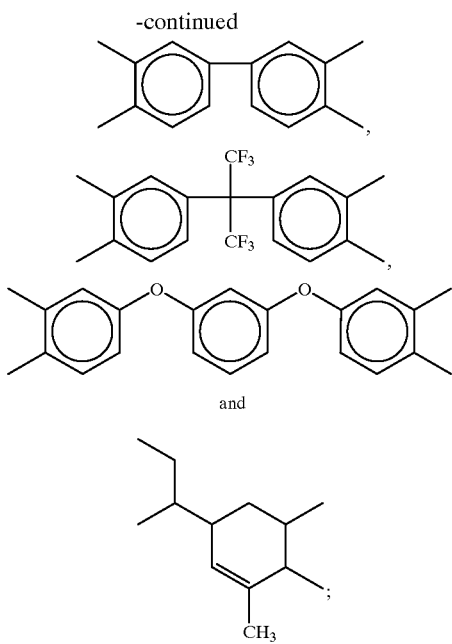

but must include the group of the following formula 2:

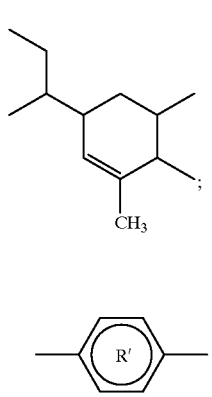

(2)

is one or more divalent groups selected from the following:

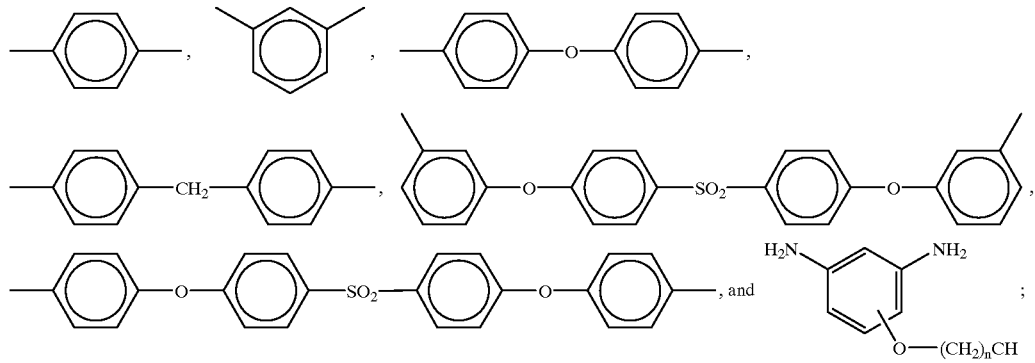

but must include the diamine group of the following formula 3:

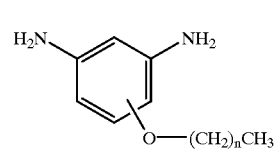

(3)

wherein, n represents a natural number between 4 to 18.

Further, according to the present invention, with respect to the preparation method of a soluble polyimide resin having an alkoxy substituent, for a liquid crystal layer, by means of a solution polymerization of aromatic diamine and tetracarboxylic acid dianhydride, the diamine therein comprises one or more of the group consisting of aromatic diamine of formula 3, oxydianiline, methylene dianiline, metabisaminophenoxy diphenylsulfone, and parabisaminophenoxy diphenylsulfone but must have diamine of formula 3. As for tetracarboxylic acid dianhydride, it comprises two or more of dianhydrides selected from group consisting of aliphatic tetracarboxylic acid dianhydride of formula 2, pyromellitic dianhydride (PMDA), benzophenonetetraboxylic dianhydride (BTDA), oxydiphthalic dianhydride (ODPA), biphenyltetracarboxylic acid dianhydride (BPDA), and hexafluoroisopropylidene diphthalic dianhydride (HFDA).

The invention herein is explained in more detail as set forth hereunder. A soluble polyimide resin having an alkoxy substituent, as represented by Formula 1, for a liquid crystal layer is manufactured by adding a mixture of dioxotetrahydrofuran 3-methylcyclohexene-1,2-dicarboxylic dianhydride, which is a tetracarboxylic acid dianhydride as represented by Formula 2, and aromatic tetracarboxylic acid dianhydride to aromatic diamine, and said dioxotetrahydrofuran 3-methylcyclohexene-1,2-dicarboxylic dianhydride (Formula 2) is used in the amount of 50 to 99 mol % to the total amount of anhydrides therein.

Further, the polyimide resin of the invention herein has a average molecular weight (MW) of about 50,000~150,000 g/mol. The inherent viscosity thereof is in the range of 0.5~1.5 dL/g. The glass transition temperature thereof is in the range of 300~400° C. Particularly, the polyimide resin under said invention is easily dissolvable at room temperature in aprotic polar solvents such as dimethylacetamide (DMAc), dimethylformamide (DMF), N-methyl-2-pyrrolidone (NMP), and organic solvents such as m-cresol. Further, the polyimide resin shows high solubility at above 10 wt % in the solvents with low boiling point such as tetrahydrofuran (THF) and chloroform, and in low hygroscopic solvents such as γ-butyrolactone, and also in the mixture solutions of the two.

Consequently, by means of mixing tetracarboxylic acid dianhydride of formula 2 to the conventional aromatic dianhydride in an appropriate ratio, the deterioration of the mechanical and heat-resistance properties can be minimized while providing a polyimide resin with enhanced solubility. At the same time, for the purpose of improving the liquid crystal alignment capacity, the modified diamine mixture with a novel structure of formula 3 was used in the reaction, thereby providing a novel soluble polyimide resin having superior heat-resistance, light transparency and liquid crystal alignment capacity.

Since the polyimide resin of the present invention shows superior solubility and liquid crystal alignment capacity while maintaining the characteristics of the conventional polyimide resin, it can be used as core heat-resistance material in advanced industries such as electric, electronics and aerospace.

According to the present invention, with respect to the manufacturing method of a polyimide resin by means of a solution polymerization of an aromatic diamine substituent and tetracarboxylic acid dianhydride, the diamine therein comprises one or more of the group consisting of aromatic diamine of formula 3, oxydianiline, methylene dianiline, metabisaminophenoxy diphenylsulfone, and parabisaminophenoxy diphenylsulfone but must have diamine of formula 2. As for tetracarboxylic acid dianhydride, it comprises two or more of dianhydride selected from group consisting of aliphatic tetracarboxylic acid dianhydride of formula 2, pyromellitic dianhydride (PMDA), benzophenonetetraboxylic dianhydride (BTDA), oxydiphthalic dianhydride (ODPA), biphenyltetracarboxylic acid dianhydride (BPDA), and hexafluorisopropylidene diphthalic dianhydride (HFDA).

The following examples illustrate various aspects of the invention herein but are not to be construed to limit the claims in any manner whatsoever.

EXAMPLE 1

Preparation of 2,4-dinitro-octadecanoxy-benzene (DN-L-18O)

To a 250 ml reactor equipped with an agitator and nitrogen-inlet, nitrogen gas was slowly influxed as 2,4-dinitrophenol (7.36 g, 0.04 mole) was dissolved in 50 ml of the reacting solvent of dimethylacetamide. While influxing nitrogen gas, $K_2CO_3$ (6.99 g, 0.05 mole), 1-iodooctadecane (19 g, 0.05 mole) was slowly added and refluxed for 48 hours. The mixture was precipitated in excess distilled water. Thereafter, the solid material so filtered was recrystalized to obtain 2,4-dinitro-octadecanoxy-benzene (DN-L-18O) with the yield of 72%.

The above process was carried out with changing the number of carbon atom between 4 to 16 in the alkyl group of a halogen compounds in place of 1-iodooctadecane to yield DN-L-4O, DN-L-6O, DN-L-8O, DN-L-10O, DN-L-12O, DN-L-14O, DN-L-16O, respectively.

EXAMPLE 2

Preparation of 2,4-diamino-n-octadecanoxy-benzene (DA-L-18O)

DN-L-18O (4.51 g, 0.01 mole) was dissolved in 100 ml of ethanol, after which was placed in a hydrogenator along with 2.0 g of 5% Pd/C (catalyst for hydrogenation, in which the surface of the carbon powder has been coated at 5% with palladium metal). As such, the reduction reaction was carried out at 60° C. for 2 hours. After filtering of the reaction mixture, the solvent was removed by distillation under reduced pressure. The mixture was re-crystallized under ethanol/water co-solvent to yield 2,4-diamino-n-octadecanoxy-benzene (DA-L-18O) with the reaction yield of 93.0%. The $^1$NMR spectrum of the DA-L-18O is shown in FIG. 1.

The above processes were carried by means of substituting DN-L-18O with DN-L-4O, DN-L-6O, DN-L-8O, DN-L-10O, DN-L-12O, DN-L-14O or DN-L-16O. The yields from above processes were 58% for DA-L-4O, 56% for DA-L-6O, 62% for DA-L-8O, 64% for DA-L-10O, 65% for DN-L-12O, 75% for DA-L-14O or 69% for DA-L-16O, respectively.

EXAMPLE 3

To a 50 ml reactor equipped with an agitator, thermometer, nitrogen-inlet, dropping funnel and condenser, nitrogen gas was slowly influxed as p-phenylene diamine (p-PDA: 9.72 g, 0.09 mole) and modified diamine DA-L-4O (2.07 g; 0.01 mole) were dissolved in the reaction solvent of m-cresol. Thereafter, while influxing the nitrogen gas, a mixture of dioxotetrahydrofuran 3-methylcyclohexene-1,2-dicarboxylic dianhydride (DOCDA: 13.2 g, 0.05 mole) and pyromellitic acid dianhydride (10.9 g; 0.05 mole) were slowly added therein with the solid content of 10 wt %. The reaction mixture was heated to 70° C. and kept at that temperature for 2 hours, and then the solution temperature was slowly raised to 200° C. and refluxed for 6~12 hours. As an imidization catalyst, isoquinoline (1~5 wt %) was used. After the reaction, the mixture was precipitated using the Waring blender in excess methanol for several times. Then, the filtered polymer was washed with water and methanol for several times and dried under reduced pressure at 120° C. to yield a polyimide resin (P-1). The yield of polymerization was quantitative in nature. The inherent viscosity was measured at a concentration of 0.5 g/dL in m-cresol at 30° C. The glass transition temperature was measured by Differential Scanning Calorimeter (DSC).

EXAMPLE 4

The same method as in Example 3 was carried out except for the use of DA-L-6O (2.35 g, 0.01 mole) in stead of DA-L-4O in order to yield a polyimide resin (P-2), and the physical property of the polymer so obtained is shown in Table 1.

EXAMPLE 5

The same method as in Example 3 was carried out except for the use of DA-L-8O (2.63 g, 0.01 mole) in stead of DA-L-4O in order to yield a polyimide resin (P-3), and the physical property of the polymer so obtained is shown in Table 1.

EXAMPLE 6

The same method as in Example 3 was carried out except for the use of DA-L-4O (2.91 g, 0.01 mole) in stead of DA-L-4O in order to yield a polyimide resin (P-4), and the physical property of the polymer so obtained is shown in Table 1.

EXAMPLE 7

The same method as in Example 3 was carried out except for the use of DA-L-12O (3.19 g 0.01 mole) in stead of DA-L-4O in order to yield a polyimide resin (P-5), and the physical property of the polymer so obtained is shown in Table 1.

EXAMPLE 8

The same method as in Example 3 was carried out except for the use of DA-L-14O (3.47 g, 0.01 mole) in stead of DA-L-4O in order to yield a polyimide resin (P-6), and the physical property of the polymer so obtained is shown in Table 1.

EXAMPLE 9

The same method as in Example 3 was carried out except for the use of DA-L-16O (3.75 g, 0.01 mole) in stead of DA-L-4O in order to yield a polyimide resin (P-7), and the physical property of the polymer so obtained is shown in Table 1.

EXAMPLE 10

The same method as in Example 3 was carried out except for the use of DA-L-18O (4.03 g, 0.01 mole) in stead of DA-L-4O in order to yield a polyimide resin (P-8), and the physical property of the polymer so obtained is shown in Table 1.

COMPARATIVE EXAMPLE

The same method as in Example 3 was carried out except for the use of 1.08 g of p-phenylene diamine (PDA; 0.01 mol) and 2.64 g of dioxotetrahydrofuran 3-methylcyclohexene-1,2-dicarboxylic dianhydride (DOCDA; 0.01 mol) in order to yield a polyimide resin (P-9), and the physical property of the polymer so obtained is shown in Table 1.

TABLE 1

Physical Properties of Polyimide Resins

| Examples | Polymer | Inherent Viscosity (dL/g) | Glass Transition Temperature (° C.) | Tensile Strength |
|---|---|---|---|---|
| Example 3 | P-1 | 0.94 | 325 | 1,450 |
| Example 4 | P-2 | 0.72 | 318 | 1,280 |
| Example 5 | P-3 | 0.85 | 305 | 1,380 |
| Example 6 | P-4 | 0.92 | 328 | 1,350 |
| Example 7 | P-5 | 0.87 | 330 | 1,210 |
| Example 8 | P-6 | 0.91 | 315 | 1,380 |
| Example 9 | P-7 | 0.93 | 315 | 1,290 |
| Example 10 | P-8 | 0.98 | 308 | 1,320 |
| Comp. Example | P-9 | 1.31 | 330 | 990 |

As shown in Example 2, for diamine monomers with long alkyl side chains connected by ether groups, the yields thereof after recrystalization were confirmed to be relatively high at the level of 60% or more. As the substituted alkyl group became longer, the oxidation reaction in air became slower, showing relatively superior storage stability.

Further, as shown in Table 1, the polyimide resins prepared according to the present invention were all amorphous and transparent, and the inherent viscosity values were in the range of 0.5 to 1.5 dL/g. Further, the property of film prepared by solvent casting and mechanical characteristics were also excellent. In particular, the polyimide resin of the present invention with appropriate combination of aromatic and alicyclic anhydrides had significantly enhanced mechanical characteristics as compared to the conventional polyimide resin comprising alicyclic anhydrides. The tensile strength as measured were in the range of 1,200 and 1,450 kg/cm$^2$.

Further, the polyimides obtained from above examples were dissolved in γ-butyrolactone and coated with a thin film (coating condition: 25 seconds at 400 to 4,000 rpm), after which the rubbing process was carried out. The characteristics of the liquid crystal cells manufactured therefrom are shown in Table 2. The alignment property of the liquid crystal was observed under a polarization microscope. The pretilt angles of the respective liquid crystal cells were measured by the crystal rotation method.

TABLE 2

| Polymer | Liquid Crystal Alignment Capacity | Pretilt Angle(°) |
|---|---|---|
| P-1 | Excellent | 7.9 |
| P-2 | Excellent | 9.8 |
| P-3 | Excellent | 13.2 |
| P-4 | Excellent | 9.9 |
| P-5 | Excellent | 12.4 |
| P-6 | Excellent | 17.7 |
| P-7 | Excellent | 15.9 |
| P-8 | Excellent | 16.5 |

As shown in Table 2, the liquid crystal alignment layer using the polyimide resin according to the present invention showed superior liquid crystal alignment capacity and high pretilt angles. Further, the pretilt angles were in the range of 5~20° C., which were deemed to be appropriate for the liquid crystal alignment layer for the Thin Film Transistor Liquid Crystal Display (TFT-LCD) or STN LCD.

The polyimide resin under the present invention not only has superior heat-resistance and mechanical characteristics but also excellent solubility and transparency, which could be applicable as a liquid crystal alignment layer for the TFT-LCD requiring difficult processing condition such as a low temperature and vigorous rubbing processing. Further, the polyimide resin may be useful as basic heat resistant structural materials for advanced industry.

What is claimed is:

1. A soluble polyimide resin having alkoxy substituents, as expressed by formula 1, prepared by a process which comprises adding a mixture of an aliphatic tetracarboxylic anhydride as expressed by formula 2 and aromatic tetracarboxylic acid to an aromatic diamine, in which said aliphatic tetracarboxylic anhydride of formula 2 is used in the amount of 50 to 99 mole % to the total amount of anhydrides:

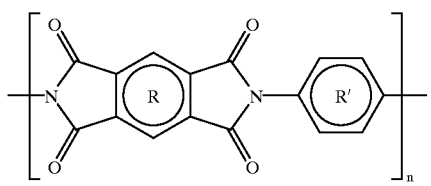

(1)

wherein

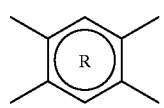

is two or more tetravalent groups selected from:

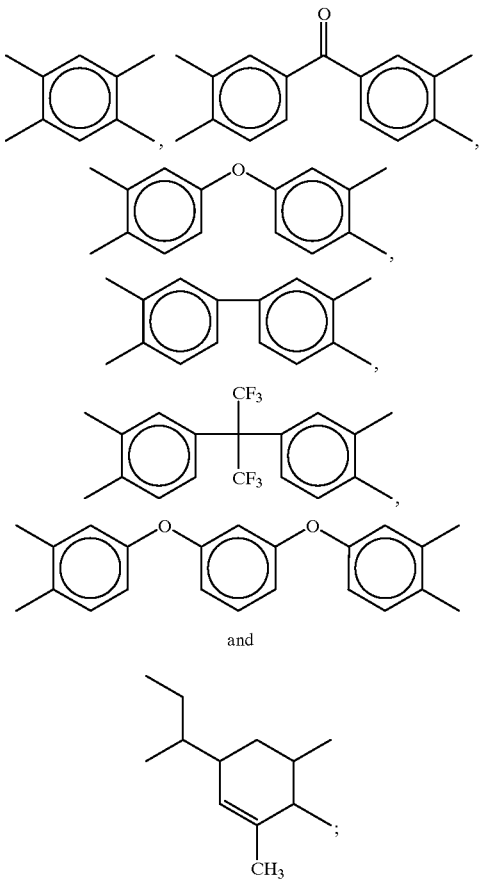

but must include the group of the following formula 2

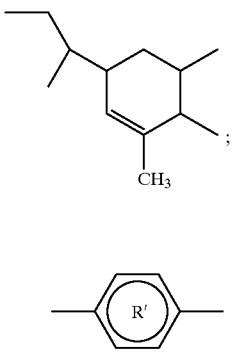

is one or more groups selected from:

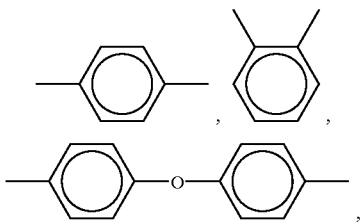

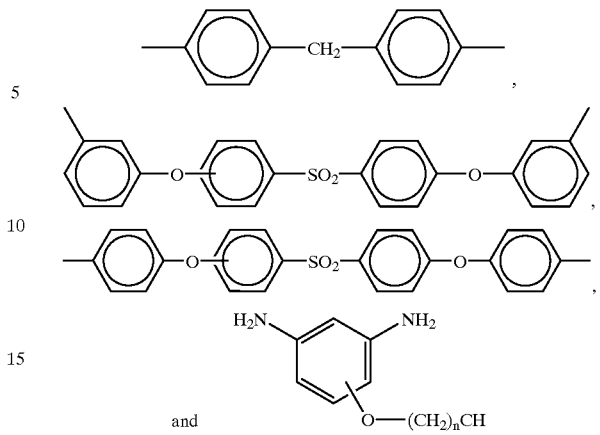

but must include the aromatic diamine group of the following formula 3:

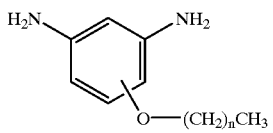

(3)

wherein, n represents a natural number between 4 to 18.

2. A soluble polyimide resin according to claim 1, wherein the inherent viscosity of said polyimide resin is in the range of 0.5~1.5 dL/g.

3. A soluble polyimide resin according to claim 1, wherein the average molecular weight of said polyimide resin is in the range of 50,000~150,000 g/mol.

4. A soluble polyimide resin according to claim 1, wherein the glass transition of temperature of said polyimide resin is in the range of 300~400° C.

5. A soluble polyimide resin according to claim 1, wherein the pretilt angle of said polyimide resin is in the range of 5°~20°.

6. A soluble polyimide resin according to claim 1, wherein said polyimide resin is soluble at room temperature in a solvent comprising one of the following group, or a co-solvent comprising two or more mixtures of the following group: dimethylacetamide, dimethylformamide, N-methyl-2-pyrrolidone, tetrahydrofuran, chloroform, acetone, ethyl acetate and m-cresol, and γ-butyrolactone.

7. A method for the preparation of a soluble polyamide resin having alkoxy substituents, as expressed by formula 1, for a liquid crystal alignment layer, by means of solution polymerization of an aromatic diamine substituent and tetracarboxylic acid dianhydride, wherein one or more of diamine is selected from the group consisting of the aromatic diamine of formula 3, oxydianiline, methylene dianiline, metabisaminophenoxy diphenylsulfone, and para-bisaminophenoxy diphenylsulfone; and two or more of said dianhydrides are selected from the group consisting of aliphatic tetracarboxylic acid dianhydride of formula 2, pyromellitic dianhydride (PMDA), benzophenonetetraboxylic dianhydride (BTDA), oxydiphthalic dianhydride (ODPA), biphenyltetracarboxylic acid dianhydride (BPDA), and hexafluorisopropylidene diphthalic dianhydride (HFDA):

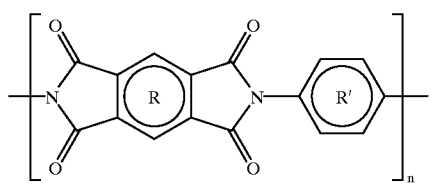(1)
wherein
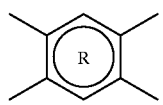
is two or more tetravalent groups selected from the following:
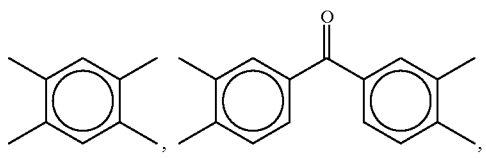
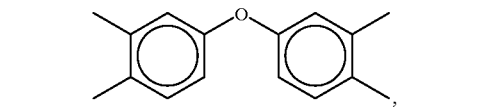
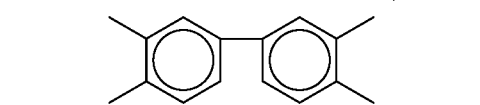
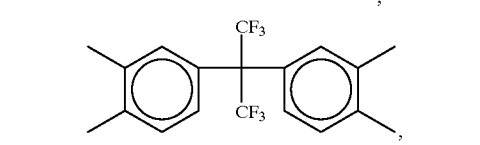
-continued
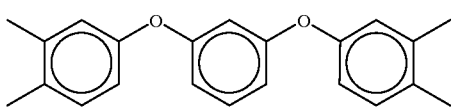
and
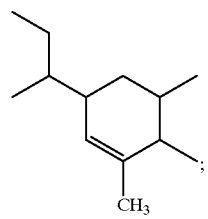
but must include the group of the following formula 2:
(2)
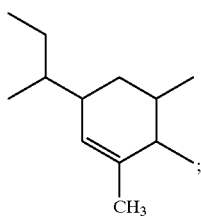
is one or more divalent groups selected from the following:
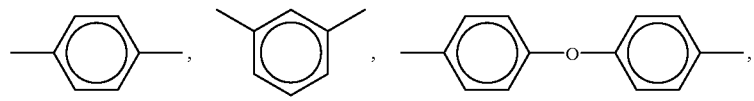
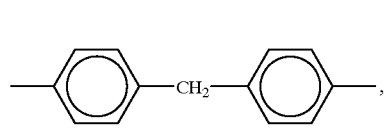, 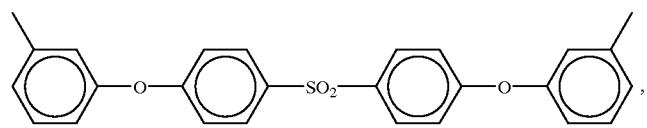
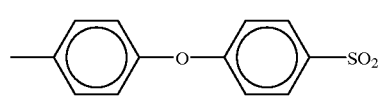, and 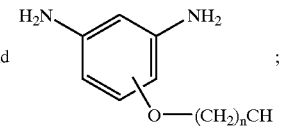
;

but must include the aromatic diamine group of the following formula 3:
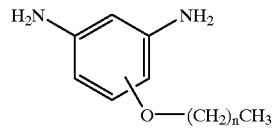
(3)
wherein, n represents a natural number between 4 to 18.
8. A method according to claim 7, wherein said solution polymerization comprises one-step polyimidization in m-cresol.
* * * * *